(12) United States Patent
Solomon et al.

(10) Patent No.: US 10,124,300 B2
(45) Date of Patent: *Nov. 13, 2018

(54) FLUX-ENHANCED HIERARCHICAL POROUS MEMBRANE FOR OIL-WATER NANOEMULSION SEPARATION

(71) Applicant: Massachusetts Institute of Technology, Cambridge, MA (US)

(72) Inventors: Brian Richmond Solomon, Rockville, MD (US); Kripa K. Varanasi, Lexington, MA (US); Md. Nasim Hyder, Somerville, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 336 days.

This patent is subject to a terminal disclaimer.

(21) Appl. No.: 14/303,297

(22) Filed: Jun. 12, 2014

(65) Prior Publication Data

US 2014/0332462 A1    Nov. 13, 2014

Related U.S. Application Data

(63) Continuation-in-part of application No. 13/781,601, filed on Feb. 28, 2013.

(Continued)

(51) Int. Cl.
*B01D 71/50* (2006.01)
*B01D 71/42* (2006.01)
(Continued)

(52) U.S. Cl.
CPC .......... *B01D 71/50* (2013.01); *B01D 17/085* (2013.01); *B01D 69/02* (2013.01); *B01D 69/10* (2013.01); *B01D 71/42* (2013.01); *C02F 1/44* (2013.01); *B01D 67/0034* (2013.01); *B01D 67/0093* (2013.01); *B01D 71/021* (2013.01); *B01D 71/027* (2013.01); *B01D 71/68* (2013.01); *B01D 2325/02* (2013.01); *B01D 2325/022* (2013.01); *B01D 2325/04* (2013.01); *B01D 2325/38* (2013.01); *C02F 1/40* (2013.01);
(Continued)

(58) Field of Classification Search
None
See application file for complete search history.

(56) References Cited

U.S. PATENT DOCUMENTS 7,350,427 B2 *   4/2008   Sandra ............... B01J 20/26
                                                    436/177
7,854,846 B2 * 12/2010   Goldsmith ......... B01D 61/145
                                                    210/500.21
(Continued)

OTHER PUBLICATIONS

Bouzerara et al. (Journal of the European Ceramic Society, 2006, 26, 1663-1671).*

*Primary Examiner* — Clare M Perrin
(74) *Attorney, Agent, or Firm* — Steptoe & Johnson LLP

(57) ABSTRACT

Hierarchical porous membranes suitable for use in oil/water separation processes are provided. The membranes described herein are particularly well suited for separating trace amounts of water (e.g., no greater than 3 wt % water content, no greater than 1 wt % water content, or 50-1000 ppm water) from oil in droplets less than 1 um in size. The membranes have a wide range of applications, including deep seep oil exploration, oil purification, and oil spill cleanup.

9 Claims, 18 Drawing Sheets

Related U.S. Application Data

(60) Provisional application No. 61/604,421, filed on Feb. 28, 2012.

(51) Int. Cl.
*B01D 71/82* (2006.01)
*B01D 69/02* (2006.01)
*C02F 1/44* (2006.01)
*B01D 17/00* (2006.01)
*B01D 69/10* (2006.01)
C02F 1/40 (2006.01)
B01D 71/68 (2006.01)
B01D 67/00 (2006.01)
C10G 33/06 (2006.01)
C02F 101/32 (2006.01)
B01D 71/02 (2006.01)

(52) U.S. Cl.
CPC ......... *C02F 1/444* (2013.01); *C02F 2101/32* (2013.01); *C02F 2101/325* (2013.01); *C10G 33/06* (2013.01)

(56) References Cited

U.S. PATENT DOCUMENTS

2008/0197072 A1* 8/2008 Ansorge ............. B01D 67/0011 210/500.41
2008/0299377 A1* 12/2008 Gu .................... B01D 39/2075 428/307.7
2009/0241496 A1* 10/2009 Pintault ................... C23C 4/11 55/524

* cited by examiner

FLUX-ENHANCED HIERARCHICAL POROUS MEMBRANE FOR OIL-WATER NANOEMULSION SEPARATION

CROSS-REFERENCE TO RELATED APPLICATION

This application is a continuation-in-part of U.S. Non-Provisional patent application Ser. No. 13/781,601 filed on Feb. 28, 2013, which claims priority to and the benefit of U.S. Provisional Patent Application No. 61/604,421, filed Feb. 28, 2012, the entire contents of which are incorporated herein by reference in their entireties.

TECHNICAL FIELD

This invention relates generally to articles and methods for separating emulsions. More particularly, in certain embodiments, a hierarchical porous membrane is provided for separating oil and water.

BACKGROUND

Separation of oil and water mixtures is of great importance across a wide range of technologies and industries. For example, oil and water separation problems gained national attention during the 2010 Gulf oil spill and subsequent cleanup efforts. The petroleum industry faces similar water and oil separation challenges as it attempts to extract oil from beneath the sea.

Existing separation devices and methods are either environmentally unfriendly, extremely energy intensive, or incapable of performing the desired separations. For example, in deep sea oil extraction, one energy-intensive approach is to pump oil emulsified in water from the ocean floor to the surface where it is stored it in gravity separation tanks. In addition, once much of the water has been removed from the oil, existing techniques (e.g., ultracentrifugation) are incapable of removing additional, trace amounts of water that remain. These trace amounts of water in oil may cause problems for end users, process equipment, and machinery. In addition, conventional techniques are incapable of removing trace amounts of oil from water—which is a significant environmental concern. Current separation techniques are therefore inefficient and incapable of performing the wide range of oil and water separations of interest.

In recent years, growing environmental concerns have fueled the need for efficient separation of oil-water mixtures. Oil spills, as highlighted by the Deepwater Horizon spills, have lasting detrimental ecological effects. The threat is recurring and persistent; every year over 20,000 oil spills are reported to the U.S. government. Aside from such disasters, fats, oils, and grease are classified as hazardous waste and their removal (e.g., from water before the water being released into the environment) is subject to increasingly more stringent governmental regulation. Generally, according to U.S. regulations, water needs to be cleaned to about 10 ppm of oil or less prior to being discharged.

A variety of techniques have been implemented in the industry, including gravity separation, skimming, and dissolved air flotation. In addition, techniques incorporating aerogels, fluorosurfactant polymers, and magnetic materials have been introduced. However, these approaches have turned out to be ineffective for separation of small-scale emulsions, especially for those with droplets below a micron in size.

Membranes which function primarily on the principle of size exclusion offer cost-effective separation for filtration of solid particles such as protein aggregates and macromolecules. However, it has been found that in the case of emulsified liquids, dispersed droplets can deform and squeeze through pores that are smaller than the emulsified droplet size. To prevent droplets of one phase from squeezing through a membrane, the surface energy of the membrane must be precisely controlled. Thus, separation of nanoemulsions (i.e., oil-water mixtures including sub-micron droplets) remains a key challenge that has not been met by conventional systems. Tradeoffs between geometric constraints, high breakthrough pressure for selectivity, high flux, and mechanical durability make it challenging to design effective membranes for separating nanoemulsions.

For a straight-pore membrane, complete separation of nanoemulsions requires pores smaller than the smallest droplet size. For a given applied pressure, smaller pores lead to a lower flow rate. Decreasing the thickness of the membrane can circumvent this, but extremely thin membranes lack mechanical integrity. In addition, increasing the applied pressure can increase the flow rate, but the maximum pressure must not exceed the breakthrough pressure. Hence, there is a need for new membrane architectures that can achieve both high fluxes and high selectivity while maintaining mechanical durability.

There is a need for more efficient and more environmentally-friendly devices and methods for separating oil-water emulsions (and oil and water mixtures). In particular, a need exists for separating trace amounts of water from oil-water emulsions and for separating trace amounts of oil from oil-water emulsions, including nanoemulsions.

SUMMARY OF THE INVENTION

Various embodiments of the invention provide a hierarchical porous membrane for separating emulsions of oil and water, and in particular, a hierarchical porous membrane for separating nanoemulsions of oil and water. The membranes discussed herein may be applied to the separation of any two immiscible liquids. Unlike existing separation techniques, the systems and methods described herein may be used to separate trace amounts of water (e.g., no greater than 3 wt % water content, no greater than 1 wt % water content, or 50-1000 ppm water) from oil. Similarly, unlike existing separation techniques, the systems and methods described herein may be used to separate trace amounts of oil (e.g., no greater than 3 wt % oil content, no greater than 1 wt % oil content, or 50-1000 ppm oil) from water. By modulating various properties of the membrane (such as pore size, hydrophobicity, and layer thickness), parameters critical to operation can be controlled, such as the breakthrough pressure and permeability. The membranes discussed herein have a wide range of applications, including deep seep oil exploration, oil purification, water purification, and oil spill cleanup, among others.

In some embodiments, a hierarchical membrane is provided that comprises a nanoporous separation layer supported by an integrated microporous layer. The hierarchical membrane is fabricated by phase inversion process, and the fabricated membrane can separate emulsified droplets well below 1 µm in size (e.g., between 1 nm-1 µm, 1 nm to 10 nm, 5 nm to 20 nm, 15 nm to 50 nm, 50 nm to 100 nm, 100 nm to 200 nm, 100 nm to 500 nm, 500 nm to 1 µm). The hierarchical membrane includes a nanoporous separation skin layer supported by an integrated microporous layer. By tuning the thickness of the nanoporous separation layer, the flux through the membrane can be increased. In some embodiments, the manufacturability and scalability of the membrane design provides for the ability to achieve high flow rates, which is particularly desirable for large (commercial) scale operations.

Some embodiments discussed herein relate to tuning or modulating the parameters of hierarchical porous membrane fabrication to control the skin layer thickness and increase the total flux. In some embodiments, the total flux may be increased by a factor of four as compared to other similar membranes. Some embodiments discussed herein relate to fabrication of hierarchical porous membranes that may be employed on a large (commercial) scale.

In one aspect, the invention relates to a hierarchical porous membrane suitable for use in oil/water separation processes. The membrane: (i) includes a polymer; (ii) is oleophilic; (iii) is hydrophobic; (iv) has a first layer with small pores; (v) has a second layer, wherein the second layer is a support layer that is substantially thicker than the first layer and that has substantially larger pores than the first layer (e.g., where the pores in the first layer are nanopores and where the pores in the second layer are micro pores); and (vi) is configured to separate two or more phases of an oil/water emulsion having droplets below 1 μm in size.

In certain embodiments, the first layer has thickness from about 0.3 to about 2 microns or from about 0.5 to about 2 microns. In one embodiment, the first layer has average pore size from about 25 nm to about 300 nm, from about 30 nm to about 80 nm, from about 50 nm to about 200 nm, or from about 100 nm to about 150 nm. In some embodiments, the support layer has a thickness from about 55 microns to about 370 microns. In some embodiments, the support layer has an average pore size from about 10 microns to about 25 microns or from about 10 microns to about 20 microns.

In certain embodiments, the first layer includes a coating. In some embodiments, the coating is a silane coating or includes silane. The silane coating may include at least one member selected from the group consisting of octadecyltrichlorosilane (OTS), methylsilane, phenylsilane, isobutylsilane, dimethylsilane, tetramethyldisilane, hexylsilane, octadecylsilane, fluorosilane, and/or any combination thereof.

In certain embodiments, the polymer is selected from the group consisting of polycarbonate, polysulfone (PSf), polyacrylonitrile (PAN), polyethersulfone (PES), and any combination thereof. In certain embodiments, the membrane includes polycarbonate and wherein the membrane has a coating comprising octadecyltrichlorosilane (OTS).

In another aspect, the invention relates to a method of performing an oil/water separation. The method includes: (a) providing an initial liquid stream or volume including oil and water; (b) passing the initial liquid stream or volume through the membrane, described above, thereby allowing the passage of the oil from the initial stream or volume through the membrane and inhibiting the flow of the water from the initial stream or volume through the membrane; and (c) collecting fluid passing through the membrane, wherein the fluid that has passed through the membrane has water concentration less than the initial liquid stream or volume.

In certain embodiments, initial liquid stream or volume has water concentration no greater than 3 wt % or no greater than 1 wt %. In certain embodiments, initial liquid stream or volume has water concentration from about 50 ppm to about 1000 ppm. In some embodiments, the fluid that has passed through the membrane has water concentration no greater than about 30 ppm.

In another aspect, the invention relates to a method of preparing a hierarchical porous membrane (e.g., the membrane described above) suitable for use in an oil/water separation process (e.g., the method described above). The method includes: (a) combining a polymer, a pore former, and a solvent to make a polymer solution; (b) following step (a), allow the solution to sit for a predetermined time (e.g., 12 hours) at a predetermined temperature (e.g., 50° C.) to allow release of air bubbles; and (c) casting a thin layer (e.g., on the order of 100-500 microns) on a plate (e.g., glass plate) and immersing the plate into a solution (e.g., water at room temperature) to undergo coagulation, thereby forming the hierarchical porous membrane. In some embodiments, the method also includes (d) optionally, rinsing the hierarchical porous membrane in a second solution (e.g., water for a predetermined time period, e.g., 24 hours); and (e) optionally, immersing the hierarchical porous membrane in a third solution (e.g., 1:1 glycerol-water solution for a predetermined time period, e.g., 24 hours).

In certain embodiments, the polymer is selected from the group consisting of polycarbonate, polysulfone (PSf), polyacrylonitrile (PAN), polyethersulfone (PES), and any combination thereof. The solvent preferably includes dimethyl acetamide (DMAc) and/or n-methyl-2-pyrrolidone (NMP). In one embodiment, the pore former includes poly(vinylpyrrolidone) (PVP), polyethylene glycol (PEG), or a mixture thereof. The method may also include the step of performing plasma etching to remove at least a portion of a first layer of the membrane. In some embodiments, the plate is a glass plate. In some embodiments, step (b) comprises curing the solution in water to allow release of the air bubbles.

Elements of embodiments described with respect to a given aspect of the invention may be used in various embodiments of another aspect of the invention. For example, it is contemplated that features of dependent claims depending from one independent claim can be used in apparatus and/or methods of any of the other independent claims.

BRIEF DESCRIPTION OF THE DRAWINGS

The objects and features of the invention can be better understood with reference to the drawings described below, and the claims.

DESCRIPTION

It is contemplated that articles, apparatus, methods, and processes of the claimed invention encompass variations and adaptations developed using information from the embodiments described herein. Adaptation and/or modification of the articles, apparatus, methods, and processes described herein may be performed by those of ordinary skill in the relevant art.

Throughout the description, where articles and apparatus are described as having, including, or comprising specific components, or where processes and methods are described as having, including, or comprising specific steps, it is contemplated that, additionally, there are articles and apparatus of the present invention that consist essentially of, or consist of, the recited components, and that there are processes and methods according to the present invention that consist essentially of, or consist of, the recited processing steps.

It should be understood that the order of steps or order for performing certain actions is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

Figure 1:
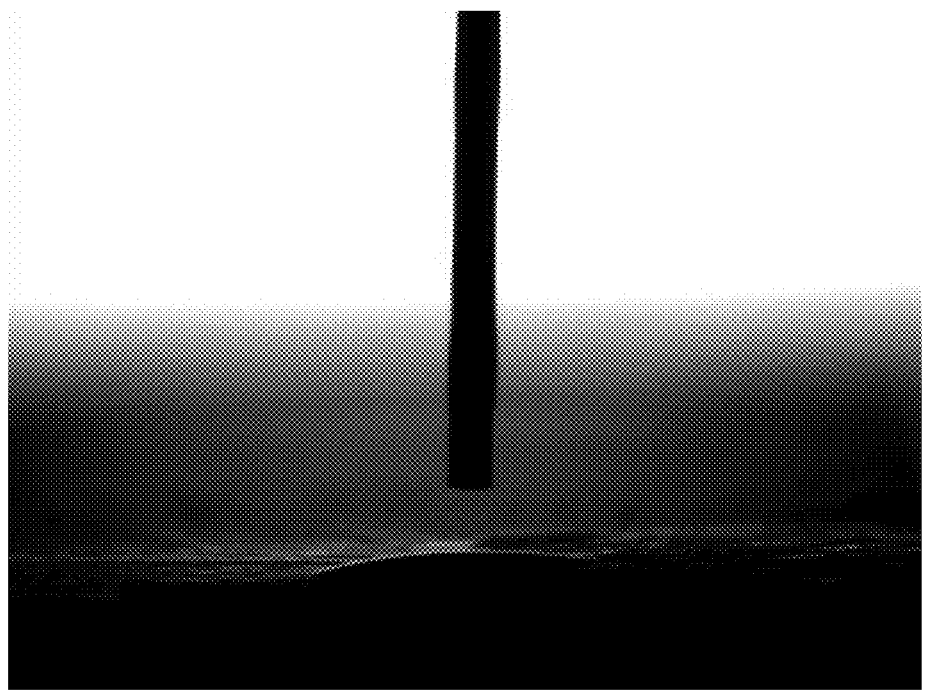
FIG. 1 is a photograph of an oil film on a membrane surface, in accordance with an illustrative embodiment of the invention.

Referring to FIG. 1, in certain embodiments, a membrane is provided that is naturally oleophilic (e.g., it is spontaneously wetted by oil) and hydrophobic (e.g., it repels water droplets). This useful property allows oil to pass through the membrane and water to be blocked or stopped. In one embodiment, the ability of the membrane to separate oil and water is due at least in part to the membrane's structure. As depicted, oil wets the membrane to form a barely visible thin film. In some embodiments, the membrane can separate nanoemulsions below 1 μm in size.

Figure 2:
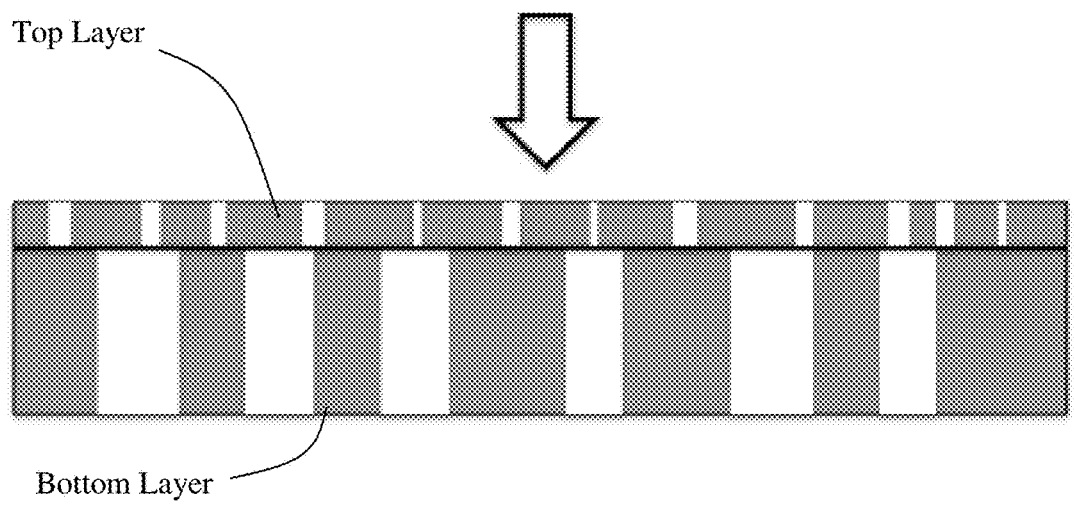
FIG. 2 is a schematic cross-sectional view of a membrane, in accordance with an illustrative embodiment of the invention.
Figure 3A:
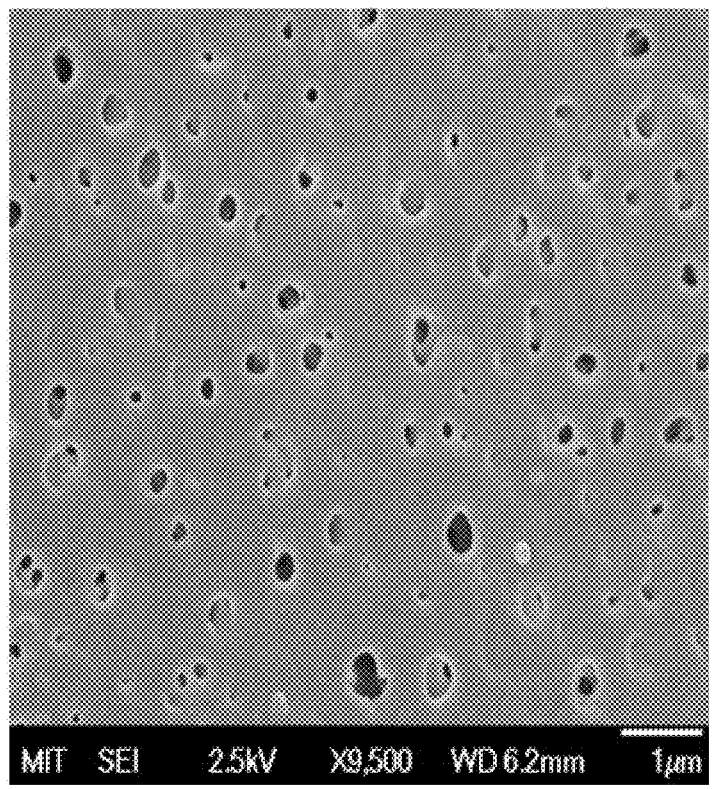
FIG. 3a is an SEM image of a top surface of a membrane, in accordance with an illustrative embodiment of the invention.
Figure 3B:
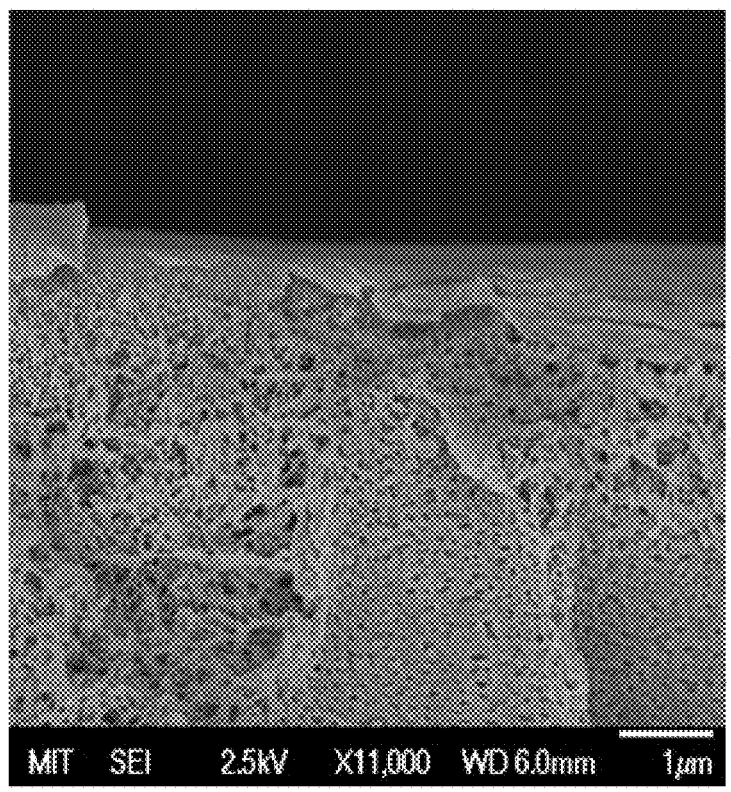
FIG. 3b is an SEM image of a cross-section of a membrane, in accordance with an illustrative embodiment of the invention.

Referring to FIGS. 2, 3a, and 3b, in certain embodiments, the membrane is about 120 μm thick and includes a top layer and a bottom layer. The top layer has a thickness $l_1$ and includes a plurality of small pores having a diameter from about 300 nm to about 500 nm. The bottom layer has a thickness $l_2$ and includes a plurality of large pores having a diameter from about 10 μm to about 50 μm. As depicted in FIG. 2, the membrane is designed for an emulsion to flow down through it, from the top layer to the bottom layer. The SEM images in FIGS. 3a and 3b show the nanoscale or small pores on a top surface of the top layer and the microscale or large pores just below the surface (in the bottom layer).

While not wishing to be bound by a particular theory, to understand how the membrane operates, consider water in contact with the top surface of the membrane. The Young-Laplace equation states that the pressure difference $p_c$ across the surface in question in given by $$p_c = \frac{2\gamma\cos\theta}{r}, \quad (1)$$

where γ is the surface tension of water, θ is the contact angle for water, and r is the pore radius. For the hydrophobic membrane, θ for water is greater than 90° and, accordingly, there is a positive pressure difference $p_c$ across the top surface that prevents the water from entering the pores. If this pressure difference is overcome, water may spontaneously enter the pores. In certain embodiments, the pressure necessary to force water to enter the pores of the membrane is referred to as the breakthrough pressure.

In various embodiments, the breakthrough pressure is controlled by varying the pore radius r. For example, a smaller pore radius r results in a higher breakthrough pressure. In addition, in one embodiment, the membrane is chemically treated to alter the contact angle for water θ.

While the hydrophobic properties of the membrane prevent the passage of water, in various embodiments, the oleophilic properties of the membrane cause oil to wet the membrane and enter the pores of the membrane spontaneously. While again not wishing to be bound by a particular theory, Darcy's law is a phenomenologically derived equation that describes fluid flow through porous media:

$$Q = \frac{-kA}{\mu}\frac{\Delta p}{L}. \quad (2)$$

In this equation, Q is the volumetric flowrate of the fluid, k is the permeability of the membrane, A is the surface area of the membrane, μ is the viscosity of the fluid, L is the thickness of the membrane, and Δp is the pressure difference across the membrane.

In certain embodiments, to maximize the flowrate of oil through the membrane, the permeability k and/or the pressure difference Δp are kept high, and/or the thickness L is kept low. To prevent the flow of water through the membrane, the pressure preferably does not exceed the breakthrough pressure.

In various embodiments, the membrane allows for the key parameters (e.g., breakthrough pressure and flowrate) to be systematically controlled. The methodology for controlling these parameters is summarized in Table 1.

TABLE 1

Key parameters for membrane.

| Property | Modify by | Positive Effects On | Negative Effects On |
|---|---|---|---|
| Decrease r | Controlling pore size | Breakthrough pressure | Permeability, flow rate |
| Increase θ | Chemical treatment | Breakthrough pressure | |
| Decrease $l_1$ | Membrane fabrication | Permeability | |
| Increase $l_2$ | Membrane fabrication | Stability | |

In some embodiments, membrane fabrication is bound by certain physical limits. For example, from a permeability standpoint, it would be preferable to make $l_1$ infinitely thin. In general, the easiest parameter of the membrane to influence or control is the pore radius r. Pore radius r, however, is coupled to both breakthrough pressure and permeability k. For example, in certain embodiments, the breakthrough pressure is inversely proportional to the radius r of the pores. At the same time, changing the radius r changes the permeability k. Fine-tuning the membrane may therefore be a delicate process.

Both breakthrough pressure and flowrate Q influence the separation efficiency of the membrane. In certain embodiments, the separation efficiency is defined as the flow of oil through the membrane divided by the total flow through the membrane. It is desirable to fine-tune the membrane to achieve the best flowrate possible.

In certain embodiments, a hierarchical porous polysulfone (PSf) membrane is manufactured using a phase inversion process (e.g., immersion precipitation). The method uses the following ingredients: a polymer (e.g., polysulfone (PSf) or polyacrylonitrile (PAN)); a solvent (e.g., organic, such as Dimethyl acetamide (DMAc) or n-methyl-2-pyrrolidone (NMP)); a non-solvent (e.g., DI water or a mixture of water/ethanol:90/10); and a pore former (e.g., poly(vinylpyrrolidone) (PVP) or Poly ethylene glycol (PEG) or a mixture of PVP/PEG (50/50)). The method includes dissolving the polymer in the solvent to produce a mixture, casting the mixture on a glass plate, and immersing the glass plate and mixture in a water bath to initiate phase inversion (also called immersion precipitation) to get the membrane films. During the phase inversion process, PVP and/or PEG creates macro pores. In general, a lower polymer concentration or addition of PEG creates bigger pores in the top layer.

In one embodiment, a porous polysulfone (PSf) membrane is prepared using a phase inversion technique based on a non-solvent induced phase separation method. A mixture of 7 g PSF and 3 g poly(vinylpyrrolidone) (PVP) is dissolved in 40 mL DMAc at 80° C. to form a homogeneous solution, which is then left at 50° C. for 12 h to allow air bubbles to be released. Using a doctor blade knife or other cutting instrument, a thin layer (0.28 mm) of polymer solution is then casted on a glass plate which is then immersed into non-solvent water at room temperature (22° C.), to undergo coagulation. Phase separation of the polymer-solvent system takes place during this process, which creates an asymmetric microporous membrane matrix. To wash away the PVP additive completely, the porous membrane is then rinsed with running tap water for 24 h, followed by immersion in a glycerol-water solution (volume ratio of 1:1) for another 24 h, before being dried at ambient conditions.

In various embodiments, polyacrylonitrile (PAN) porous membranes are prepared in a similar fashion. Compared to PSf, PAN is generally less hydrophobic (contact angle with water is 71°, compared to 84° for PSf) and usually results in bigger pores on the surface.

In various embodiments, PVP and/or PEG are used as pore forming chemicals to create uniform arrays of macropores. Without PVP and/or PEG, the formation of macropores may be random, and the quality of the membrane microstructure may be poor.

In certain embodiments, the addition of a water and alcohol (e.g., ethanol) mixture in the bath makes the non-solvent less polar and can delay the mixing of solvent (DMAc) and the non-solvent (water and ethanol). In one embodiment, this creates a membrane where the top layer pore sizes are in the scale of 50 to 300 nm, due to delayed mixing.

In certain embodiments, the top layer of the membrane has a thickness $l_1$ from about 0.3 microns to about 1 micron (e.g., as determined from cross-sectional scanning electron microscopy of the membrane film). In one embodiment, the top layer (also referred to as the active layer) provides the separation efficiency or selectivity of the membrane. As mentioned, the top layer includes the small pores (e.g., nanopores). In one embodiment, a pore diameter of the top layer is from about 25 nm to about 300 nm. The pore size may increase gradually from the top surface of the membrane to the inner structure.

In various embodiments, the bottom layer has a thickness $l_2$ from about 55 microns to about 370 microns (e.g., as determined from cross-sectional scanning electron microscopy of the membrane film). In one embodiment, the bottom layer provides mechanical support and gives negligible resistance to permeability, due to the large pores (e.g., macropores). In one embodiment, a pore diameter in the bottom layer is from about 10 microns to about 25 microns. The pore size may increase gradually toward the inner structure.

To form the top and bottom layers, in certain embodiments, the PSf polymer solution is cast as a film on a glass plate with a casting knife. The film is then immersed into a coagulation bath containing water. At the moment of immersion, DMAc diffuses out of the film, while water diffuses into the film. Because PSf is immiscible with the water, and has a relatively high molecular weight and a low diffusion coefficient, a relative velocity of the PSf molecules is very low. Diffusion therefore takes place in a polymer frame of reference. As a result of instantaneous or near-instantaneous demixing, two phases result in the glass plate. In one embodiment, a first phase that is poor (lean) in polymer creates macropores for the bottom layer, and a phase that is rich in polymer creates nanopores for the top layer, for selective separation.

Figure 4:
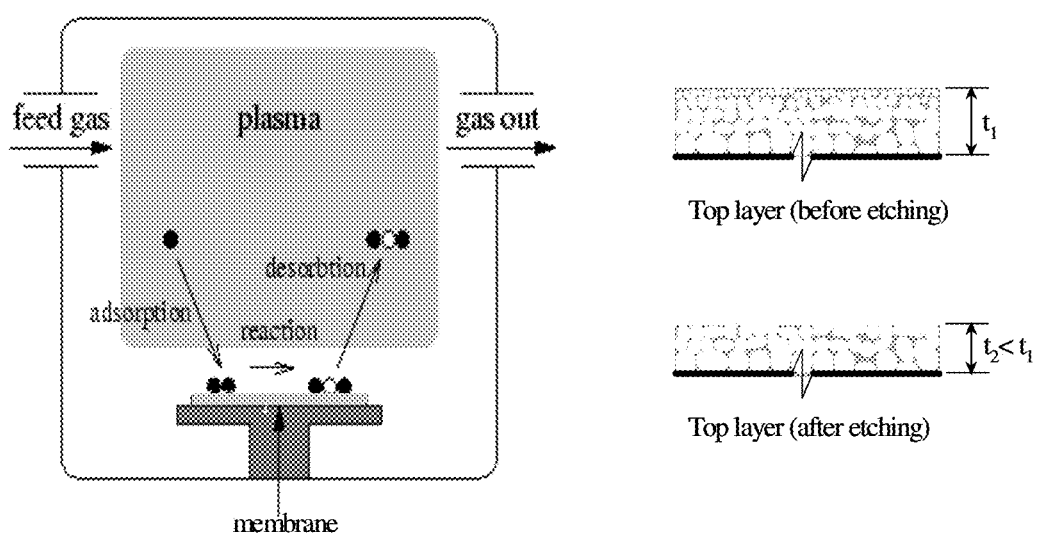
FIG. 4 includes a schematic front view of a plasma etching process, in accordance with an illustrative embodiment of the invention.

In certain embodiments, to improve the permeability of the PSf and/or PAN hierarchical membranes, selective or plasma etching of the top layer (e.g., where the pore sizes are 30-300 nm) is performed. The plasma etching is preferably performed in an $O_2$ (oxygen) plasma chamber in a vacuum (200 mbar), for a controlled etching time of 3 to 10 seconds. FIG. 4 is a schematic of a plasma etching process, in accordance with certain embodiments of the invention. The plasma etching removes part of polymer material from the top layer surface, thereby decreasing an effective thickness of the top layer and opening up bigger pores (e.g., with size greater than 80 nm) beneath the original surface. The plasma etching process may be helpful to increase the overall permeability of the membrane.

In certain embodiments, the membranes and methods described herein are used to remove water from oil when the water concentrations are too low to be separated with conventional devices. For example, when the water concentration is higher than 0.5% by volume in the oil-water mixture, traditional separation devices (e.g., an ultracentrifuge) may be used. However, for trace amount of water (e.g., no greater than 3 wt % water content, no greater than 1 wt % water content, or 50-1000 ppm water), these traditional separation devices may be incapable of separating the water from the oil. Advantageously, for these trace amounts, the hierarchical porous membranes described herein may be used to perform the separation. In one embodiment, these membranes have a have high affinity for oil (contact angle less than 10°) and a low affinity for water (contact angle of about 84°). In various embodiments, PSf is the polymer used to form the hierarchical porous structure suitable for the separation of low concentrations (e.g., on the order of ppm) of water from oil.

The membranes and methods have several applications in the petroleum industry. For example, the membranes and methods may be used to remove trace amounts of water from oil to obtain higher oil concentrations and improve the performance of machines that use the oil (e.g., combustion engines). The petroleum industry faces similar difficulties as it turns to the sea floor for oil extraction. Previous separation methods used for these purpose are either environmentally unfriendly or extremely energy intensive. For example, one separation method includes pumping oil emulsified in water from the sea floor to the sea surface and storing the emulsion in gravity separation tanks Pumping the complete emulsion to the surface requires substantially more power than pumping the oil alone. Hence, the methods and membranes described herein may be used to separate oil and water more effectively at the source. Once separated, the oil can be pumped to the surface for further purification.

The membranes and methods have additional applications, across many different industries. For example, the membranes and methods may be used to collect oil following an oil spill, such as the 2010 Gulf oil spill. The membranes and methods may also be used to clean water contaminated with oil before the water is released to the environment or reused. For example, the membranes and methods may be used to separate oil from the bilge water accumulated in ships, as required by the international MARPOL Convention.

Example 1

A porous polysulfone (PSf) membrane was prepared using a phase inversion technique based on a non-solvent induced phase separation method. A mixture of 7 g PSF and 3 g poly(vinylpyrrolidone) (PVP) was dissolved in 40 mL DMAc at 80° C. to form a homogeneous solution, which was then left at 50° C. for 12 h in order for air bubbles to be released. Using a doctor blade knife, a thin layer (0.28 mm) of polymer solution was then casted on a glass plate which was then immersed into non-solvent water at room temperature (22° C.), to undergo coagulation. During this process, phase separation of the polymer-solvent system took place, which created an asymmetric microporous membrane matrix. To wash away the PVP additive completely, the porous membrane was then rinsed with running tap water for 24 h, followed by immersion in a glycerol-water solution (volume ratio of 1:1) for another 24 h, before being dried at ambient conditions.

A micrometer was used to determine the composite membrane thickness by measuring at least 10 different locations, including the center. The thicknesses of the selective layers were determined from a cross-sectional SEM image analysis. The thickness (dry) of the membrane was 120±10 μm, as measured by a micrometer and later verified by SEM image analysis.

Referring again to the SEM images of FIGS. 3a and 3b, the phase inversion process created a porous polysulfone structure. As depicted, the PSf membrane includes pores of different sizes, ranging from about 100 nm to about 10 μm in diameter. The asymmetric membrane shows hierarchical porous morphology, with interconnected small pores on the surface that span a thickness of 300-500 nm, and large pores (10-50 μm) below. The dissolving of PVP in water accelerates the initial separation of polymer and solvent to form the large pores.

Figure 5:
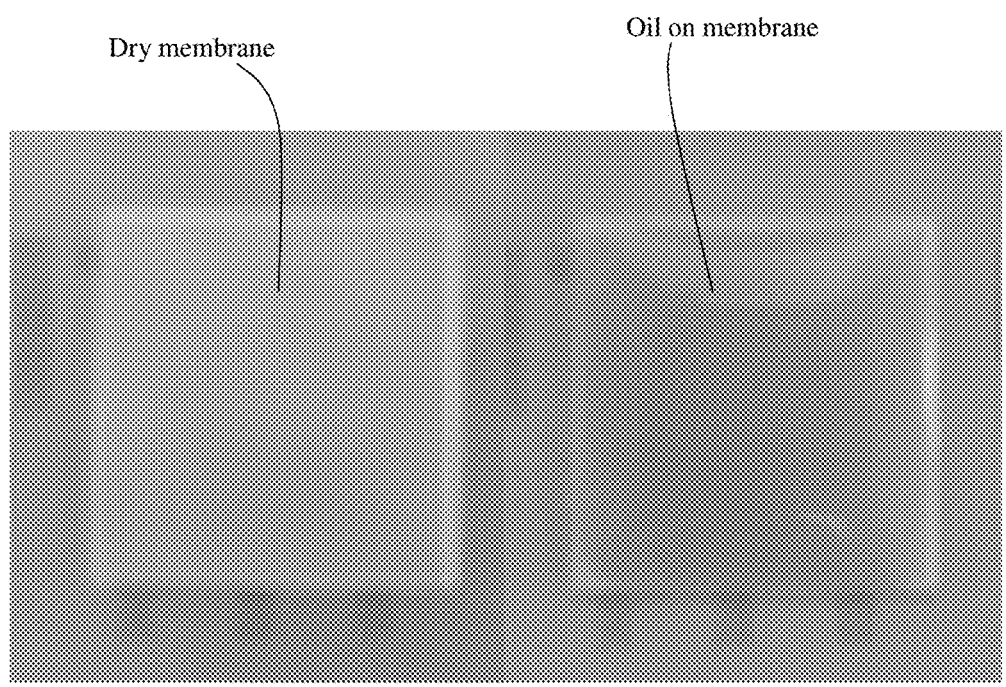
FIG. 5 includes photographs of a dry membrane and a membrane wetted by oil, in accordance with an illustrative embodiment of the invention.

To demonstrate the membrane's ability to readily wet with oil, mineral oil dyed with nile red was applied to the membrane. Referring to FIG. 5, it is clear that the oil easily wets the membrane.

In general, the stability of an oil-in-water emulsions is strongly affected by the chain length of the oil (hexadecane is better than decane). Emulsions may be prepared using a variety of methods including but not limited to sonication, freeze-pump-thaw cycles, or mechanical mixing.

Separation experiments were performed with an emulsion of water (e.g., MILLI-Q water) and oil (hexadecane). To form the emulsion, a mixture of water and hexadecane (2:1, by volume) was mechanically nebulized using a 26 gauge needle. The emulsion was allowed to settle for about 30 minutes so that macroscopic hexadecane could physically separate and rise to the top of the emulsion. The stability of the emulsion was monitored visually over a 24 hour period, enough time needed to run the membrane experiments. In general, the mixture should maintain a cloudy, turbid appearance, indicating that the emulsion remains intact. An optical microscope may be used to quantify the mechanically dispersed emulsions (hexadecane particles may be on the order of 10 microns in diameter). To determine a weight percent of dispersed hexadecane, 1 ml aliquots of the emulsion may be placed on a thin microscope slide and the water may be allowed to evaporate from the microscope slide. The weight percent is then determined from the difference between the initial mass (with water) and the final mass (no water). The final volume ratio (water to hexadecane) of the emulsions may be reported for separation testing based on the residual mass measurements. Surfactant free hexadecane-in-water emulsions have been shown to be stable for longer than 24 hours, as compared to similar suspensions of decane-in-water (e.g., stable only for about 3 hours).

Figure 6:
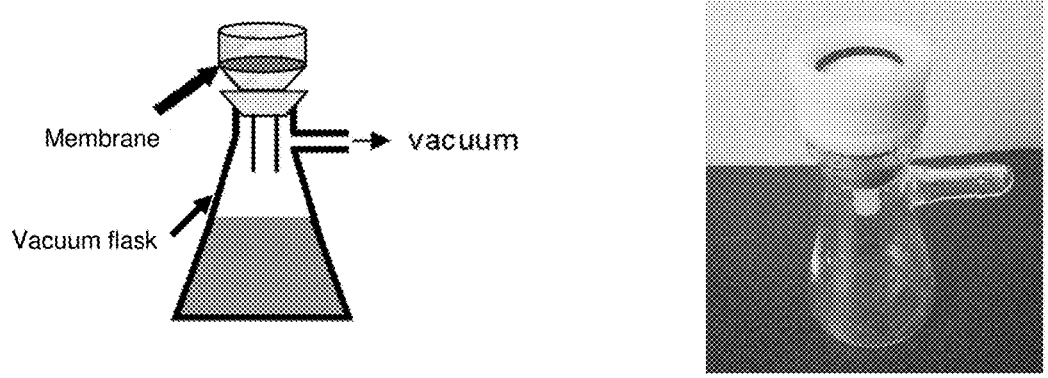
FIG. 6 includes a schematic diagram and a photograph of a device for performing oil and water separation experiments.

FIG. 6 depicts a device for performing laboratory separations of oil/water emulsions, in accordance with one embodiment of the invention. The device includes a membrane holder having a Teflon holder along with a vito o-ring, to ensure good sealing of the membrane against any pressure loss. The holder is connected to a vacuum flask with a rubber adapter. The vacuum flask is connected to a vacuum line. To perform a separation experiment, a vacuum of 10 to 14 psi may be applied and the time for a fixed volume of liquid to transport across the membrane may be recorded.

The device may be used to determine membrane permeability. For example, the time for 20 ml of water to pass through a known membrane area may be recorded. For bulk fluid flow measurements, a filtration setup is used with the membrane and sealed (e.g., using adhesive). The membranes and tubes are checked for leaks around the seal, ensuring that all fluid flow occurs only through the membrane. A pressure gauge or vacuum may be used to regulate the pressure across the membrane. In general, the pressure/vacuum is chosen such that 5-20 ml (depending on filtration setup, membrane) of water passes through a membrane during 2 to 10 minutes. Next, flow rates for water are measured. The tubes and membranes are then dried under vacuum, and the flow rate for hexadecane is measured.

In certain embodiments, membranes are tested for selectivity to determine their ability to separate water-hexadecane. Using the device, the emulsions are gravity fed through the membrane. The emulsions are injected directly into the membrane-tube setup. The fluid that passed through the membrane is then collected in a pre-weighed vial. The residual hexadecane in the vial is isolated by allowing the water to evaporate overnight. Next, the mass of the residual hexadecane is measured to determine the percentage of hexadecane that had been retained by the membrane.

Example 2

Without wishing to be bound by a particular theory, provided a the droplet radius is larger than the pore diameter, a droplet will breakthrough the membrane at pressures exceeding the breakthrough pressure, $P_B$, which may be expressed as follows:

$$P_B = \frac{2\gamma_{WO}\cos\theta_{OW}}{r_p} \quad (3)$$

where $P_B$ is the breakthrough pressure, $\gamma_{WO}$ is the interfacial energy between water and oil, $\theta_{OW}$ is the contact angle of a water droplet on the membrane surface in a background of oil, and $r_p$ is the pore radius of the membrane.

Accordingly, in order to achieve maximum rejection of water droplets, the transmembrane pressure $P_t$ must be kept below the breakthrough pressure. The relevant interface here is the interface between oil and water. The membrane should be more wetting to oil than water in order to achieve permeation of the oil phase.

Without wishing to be bound by any particular theory, when considering two immiscible phases 1 and 2, it is found that complete rejection of phase 2 and permeation of phase 1 results if two conditions are met. First, the minimum droplet size of phase 2 must be larger than the maximum pore size of the membrane. Second, phase 1 must wet the membrane more than phase 2.

$$(i) r_{2,min} > r_{pore,max} \quad (4)$$

$$(ii) \gamma_2(\sqrt{\gamma_S^{LW}\gamma_1^{LW}} + \sqrt{\gamma_S^+\gamma_1^-}) > \gamma_1(\sqrt{\gamma_S^{LW}\gamma_2^{LW}} + \sqrt{\gamma_S^+\gamma_2^-} + \sqrt{\gamma_S^-\gamma_2^+}) \quad (5)$$

wherein $r_{2,min}$ is the minimum drop radius of dispersed phase 2, $r_{p,max}$ is the maximum pore radius of the membrane, $\gamma_1$ is surface tension of phase 1, $\gamma_2$ is surface tension of phase 2, $\gamma_S^{LW}$ is Lifshitz-van der Waals parameter of the surface free energy of the membrane, $\gamma_1^{LW}$ is Lifshitz-van der Waals parameter of the surface free energy of phase 1, $\gamma_2^{LW}$ is Lifshitz-van der Waals parameter of the surface free energy of phase 2, $\gamma_S^+$ is Lewis acid parameter of surface free energy of the membrane, $\gamma_1^+$ is Lewis acid parameter of surface free energy of phase 1, $\gamma_2^+$ Lewis acid parameter of surface free energy of phase 2, $\gamma_S^-$ is Lewis base parameter of surface free energy of the membrane, $\gamma_1^-$ is Lewis base parameter of surface free energy of phase 1, and $\gamma_2^-$ is Lewis base parameter of surface free energy of phase 2.

Figure 7:
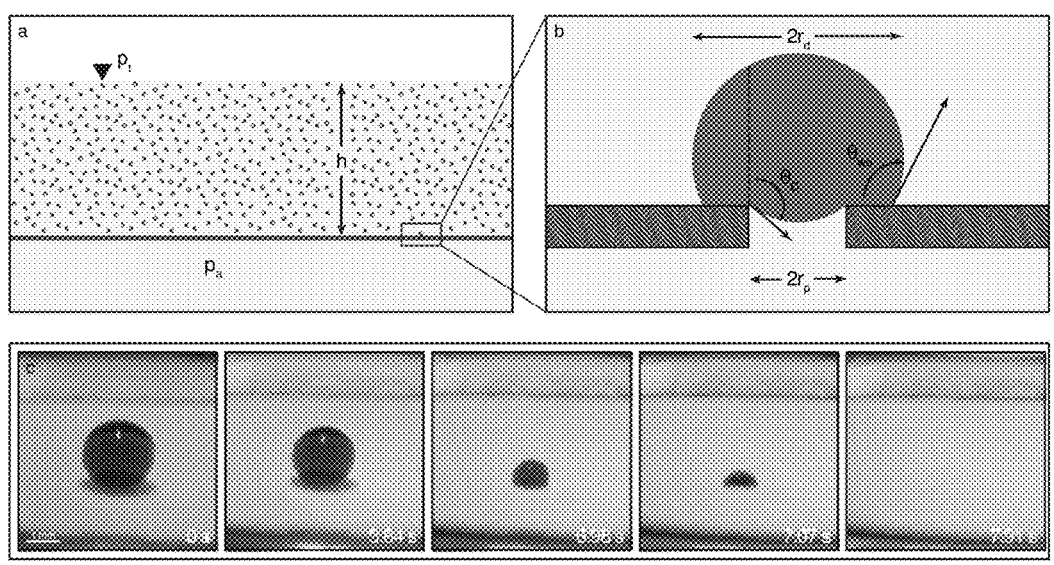
FIG. 7 includes a schematic illustration and a series of photographs of a coated polycarbonate membrane, in accordance with an illustrative embodiment of the invention.

FIG. 7 shows a) a schematic of a water/oil (w/o) emulsion being filtered through a membrane; b) a close-up diagram of a rejected droplet on the surface of the membrane; and c) frames from a video showing a 2 mm diameter droplet breakthrough a 600 nm OTS coated polycarbonate membrane.

Figure 8:
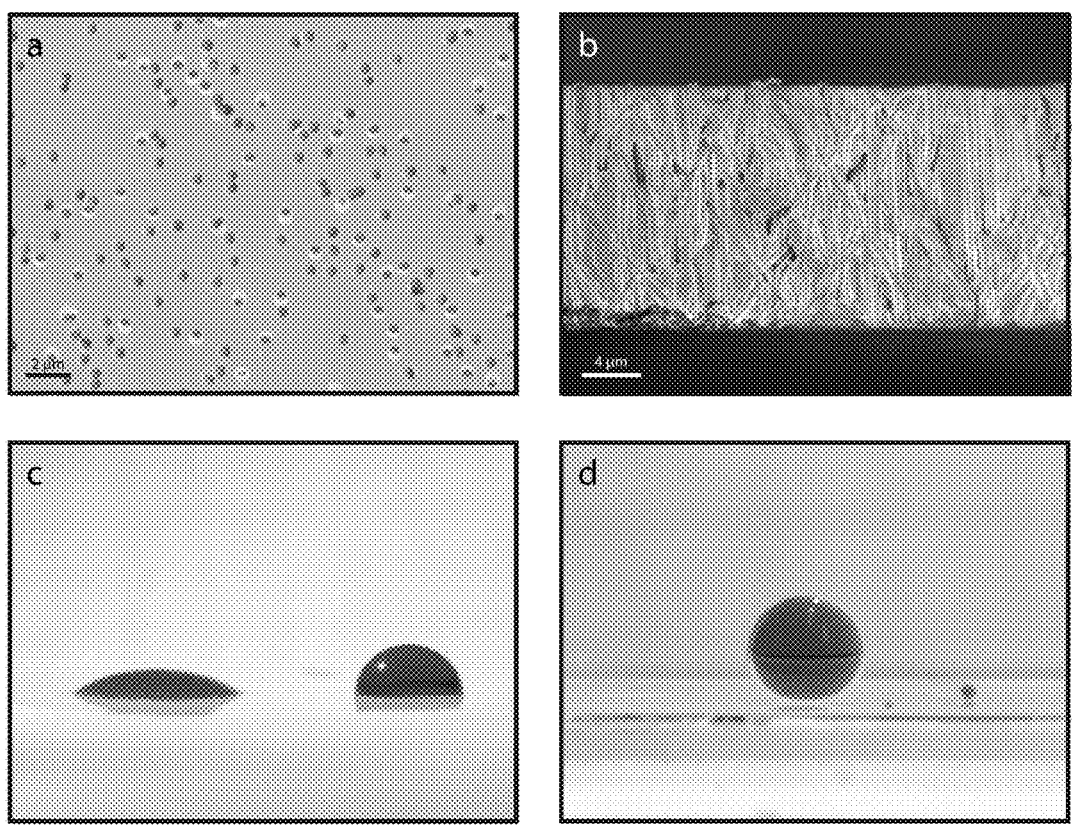
FIG. 8 includes SEM images and photographs of a coated polycarbonate membrane, in accordance with an illustrative embodiment of the invention.

In FIG. 8, SEM images of an OTS-coated 600 nm polycarbonate membrane show a) the coated top side and b) the cross section. FIG. 8c shows that in air, the membrane is oleophilic (hexadecane dyed red) and hydrophobic (water dyed red). FIG. 8d shows that when submerged in hexadecane, the membrane surface is much more hydrophobic.

To demonstrate the operation of membranes capable of filtering w/o emulsions, two polycarbonate membranes of pore sizes 600 nm and 100 nm were coated with octadecyltrichlorosilane (OTS). These membranes were prepared via the track-etch method. The membranes are prepared by exposing polycarbonate films to ion bombardment followed by a chemical etch. The pores sizes are tightly distributed around the reported values. Furthermore, the pores have regular cylindrical geometries.

Figure 9:
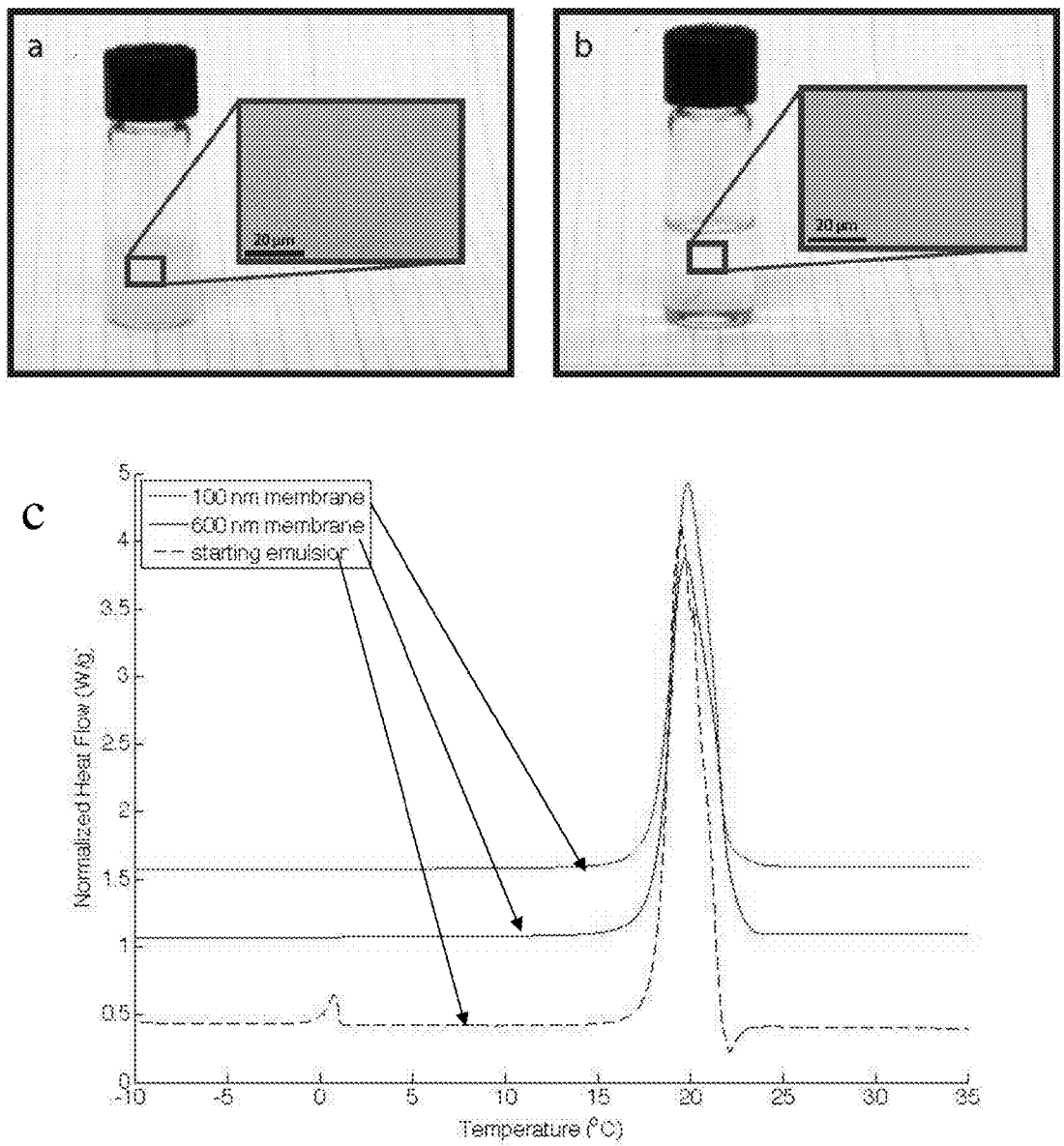
FIG. 9 includes a macroscopic photo and a microscopic photo demonstrating filtration of emulsions through coated polycarbonate membranes, in accordance with an illustrative embodiment of the invention.

FIG. 9 shows a macroscopic photo and a microscopic photo of a 3 wt % w/o emulsion stabilized by Span 80 a, before filtration and b, filtered through a 600 nm OTS coated PC membrane at a transmembrane pressure below the breakthrough pressure. FIG. 9c shows DSC data for the emulsion before filtration, filtered through a 600 nm OTS coated PC membrane, filtered through a 100 nm OTS coated PC membrane, as well as data for pure water and hexadecane with Span 80.

The membranes were tested by applying a transmembrane pressure below the calculated breakthrough pressure. With both membranes, the permeate was visually clear. Microscopy revealed that water droplets (mean size ~1.5 μm) were not in the permeate. The differential scanning calorimetry (DSC) results demonstrate that the permeate samples had very low water content.

Figure 10:
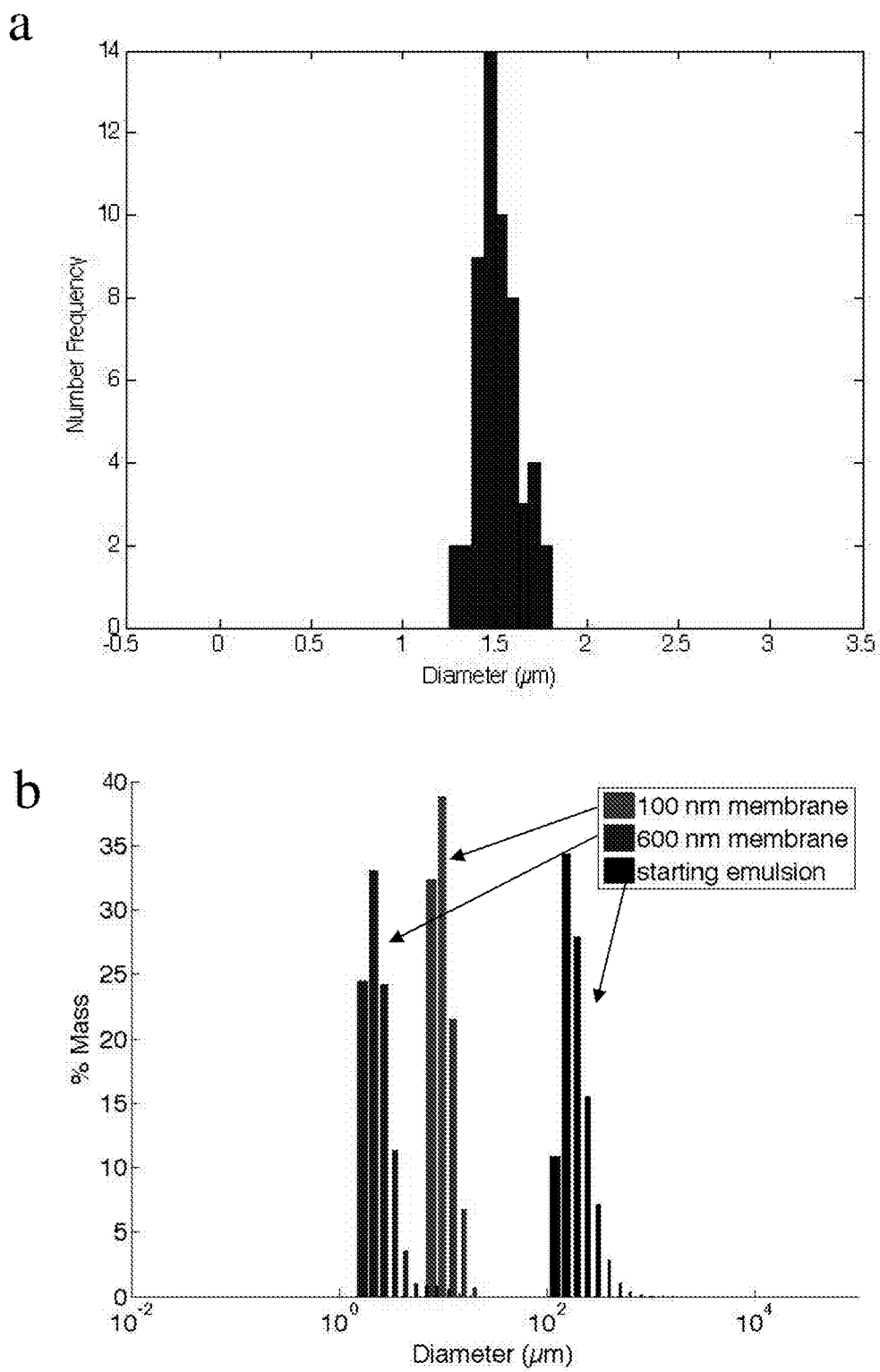
FIG. 10 includes diagrams showing distribution of water droplets on membranes used in accordance with an illustrative embodiment of the invention.

FIG. 10 shows a, Distribution of droplets in the pre-filtered emulsion and b, DLS data for the pre-filtered emulsion and permeates. Image analysis gives the distribution of water droplets in the pre-filtered emulsion. Dynamic light scattering (DLS) is used to characterize the distribution of droplets smaller than 1 μm. The pre-filtered emulsion has droplets around 100 nm while the size of droplets in both permeate samples is on average less than 10 nm.

While the 600 nm membrane and 100 nm membrane seem to perform similarly, the distribution data (particularly the DLS) should demonstrate that the 100 nm membrane filters out even the particles <600 nm.

Example 3

This Example demonstrates decreasing the skin layer thickness of the membrane while retaining its pore sizes. This results in a membrane exhibiting the same rejection characteristics but better permeabilities. Table 2 summarizes that membranes we have synthesized.

TABLE 2

Skin thickness for membranes.

| PSf concentration | PEG concentration | Skin thickness (μm) |
| --- | --- | --- |
| 100% | 0% | 1.7 |
| 95% | 5% | 1.6 |
| 90% | 10% | 0.8 |

Figure 11:
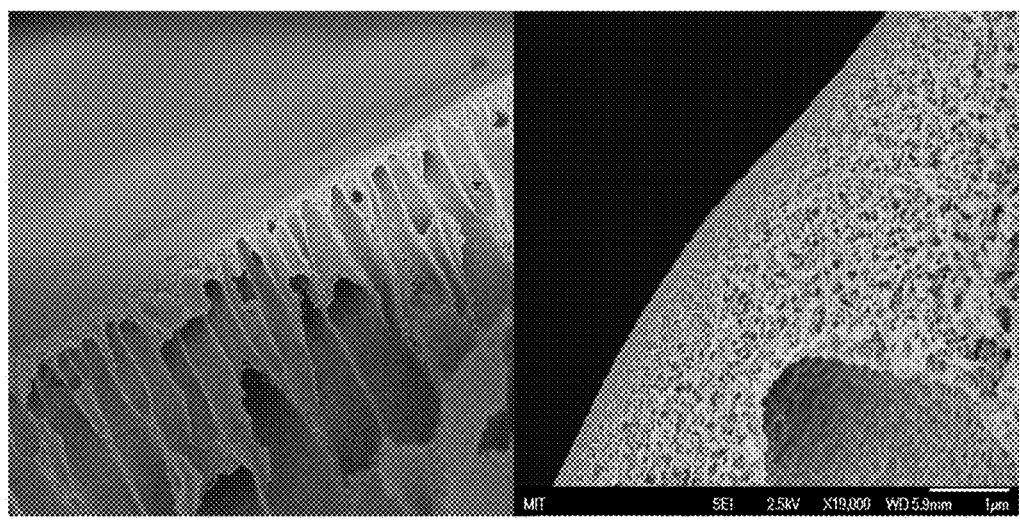
FIG. 11 are SEM images of a 100% PSf membrane in accordance with an illustrative embodiment of the invention.
Figure 12:
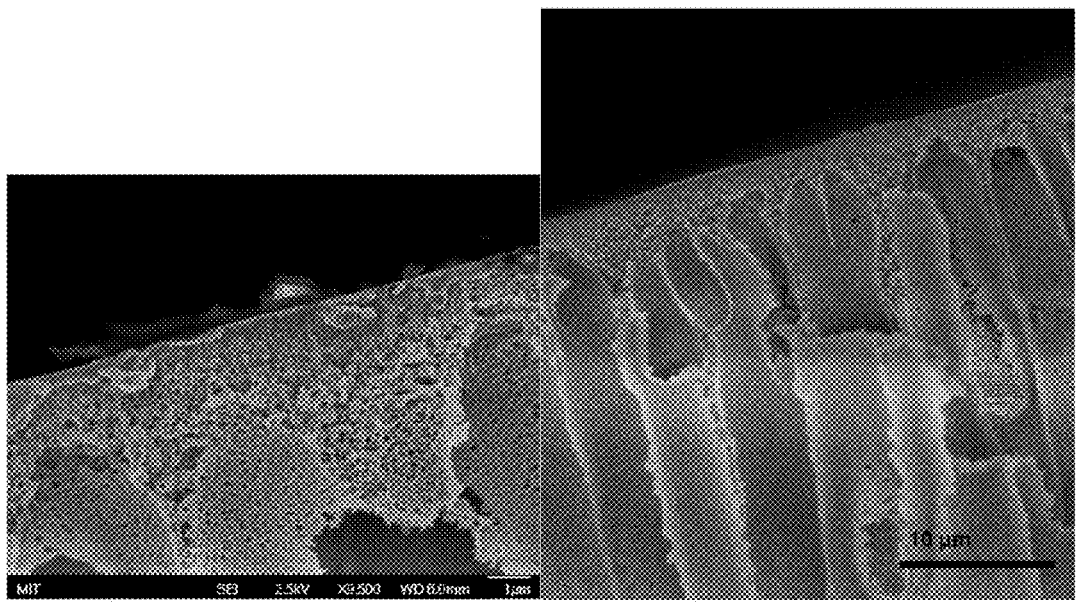
FIG. 12 are SEM images of a 95% PSf, 5% PEG membrane in accordance with an illustrative embodiment of the invention.
Figure 13:
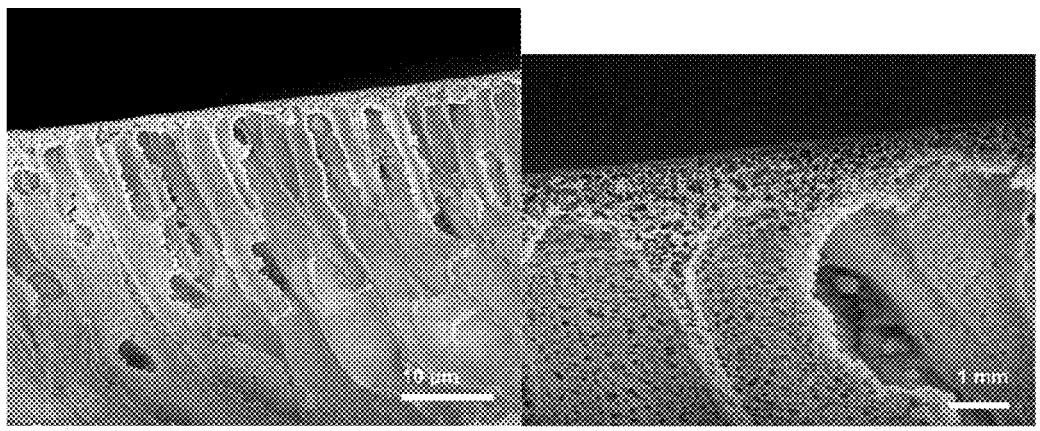
FIG. 13 are SEM images of a 90% PSf, 10% PEG membrane in accordance with an illustrative embodiment of the invention.

FIG. 11 shows SEM images of the 100% PSf membrane, FIG. 12 shows SEM images of the 95% PSf, 5% PEG membrane, and FIG. 13 shows SEM images of the 90% PSf, 10% PEG membrane.

Examples 4-6

For Examples 4-6, the following procedures were performed to prepare materials and carry out the experiments.

For performing surface modification, mesh samples were coated by submersing the samples in a solution containing 0.5 mL of octadecyltrichlorosilane (OTS, Sigma-Aldrich) dissolved in 150 mL of toluene. After sonicating for two minutes in this solution, 650 μL of water was added into the solution. After sonicating for an additional two minutes, the samples were removed and sonicated in acetone to remove residual OTS.

For polymeric samples, the coating solution was 500 μL of OTS in 100 mL of hexadecane. A similar procedure to the one discussed directly above was carried out, but residual OTS was removed using excess hexadecane rather than acetone.

For fabricating hierarchical membranes, a typical fabrication process uses 7 g PSf and 3 g polyvinylpyrrolidone (PVP) in 40 mL dimethylacetamide (DMAc) at 80° C. The solution is left at 50° C. for 12 hours in order for air bubbles to be released. A thin layer (on the order of 300 μm) of the solution is casted on a glass plate and then immersed into water at room temperature to undergo coagulation. The membrane is rinsed with tap water for 24 hours, followed by immersion in a glycerol-water solution (volume ratio of 1:1) for another 24 hours before being dried at ambient conditions. To vary the skin layer thickness, for the experiments 4-6, 7 g of PSf was mixed with 3 g of mixtures of PVP and PEG of varying ratios.

Scanning electron microscopy (SEM) images were obtained using a field-emission scanning electron microscope (JEOL 6700F, USA) at an operating voltage of 2.5 kV. The samples were coated with a 5 nm gold/palladium layer for imaging. Differential Scanning calorimetry was carried out on a TA Instruments Discovery DSC. Dynamic Light Scattering was carried out on DynaPro NanoStar (Wyatt Technology Corporation, Santa Barbara, Calif.). Contact angles were measured on an OTS coated silicon surface in the presence of air using a Ramé-Hart Model 500 Advanced Goniometer.

Example 4

Figure 14:
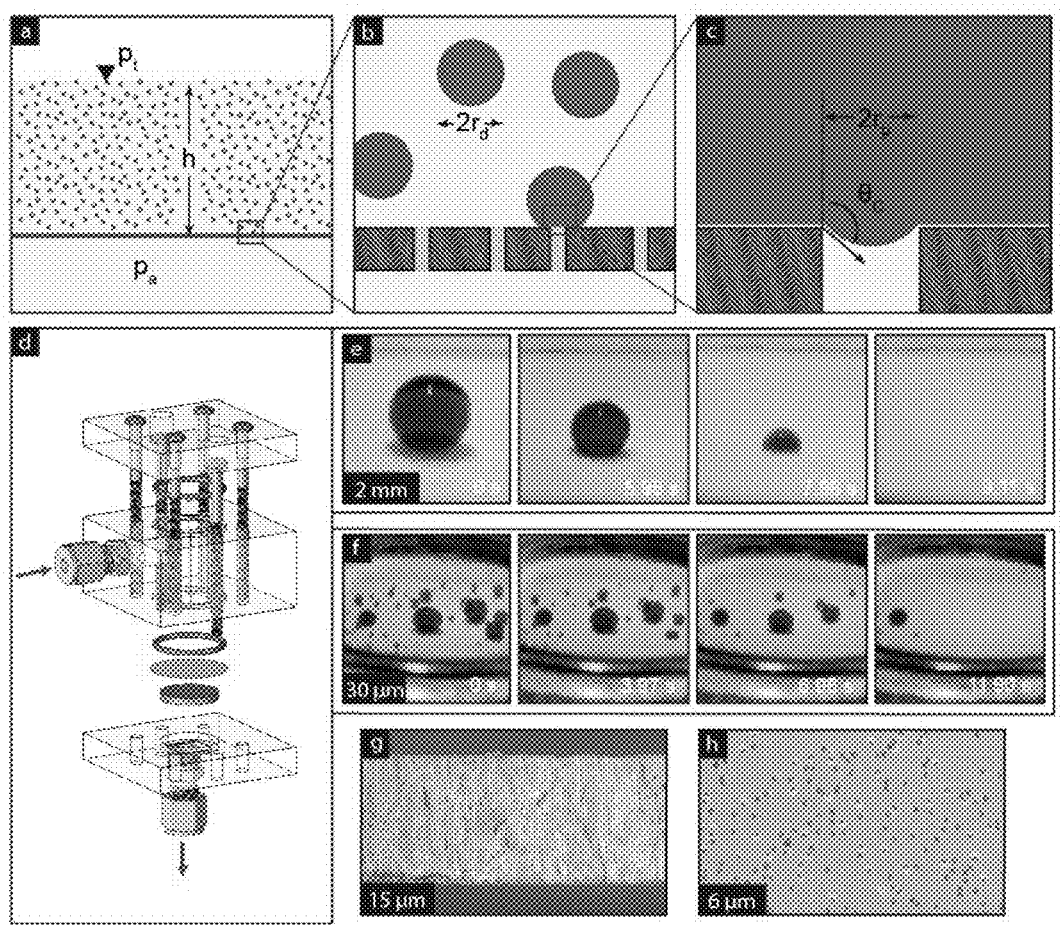
FIG. 14 are photographs, schematics and SEM images demonstrating the breakthrough pressure for polycarbonate membrane in accordance with an illustrative embodiment of the invention.

This Example 4 demonstrates the wetting thermodynamics and breakthrough pressure of flux-enhanced hierarchical membranes. An emulsion in which the continuous phase is oil and the droplet phase is water is shown in FIG. 14a-c. By considering the relative interfacial energies and spreading coefficients, it has been shown previously (Smith, J. D. et al. Soft Matter, 1772-1780, (2013), incorporated herein by reference in its entirety) that for oil to selectively impregnate a texture, it is required that.

$$\theta_{os(w)} < \theta_c < \theta_{ws(o)} \quad (6)$$

where $\theta_{os(w)}$ is the contact angle of oil (subscript "o") on the solid (subscript "s") in the presence of water (subscript "w"), $\theta_{ws(o)}$ is the contact angle of water on the smooth solid in the presence of oil, and $\theta_c$ is the critical impregnation angle given by $\theta_c = \cos^{-1}[(1-\phi)/(r-\phi)]$. Here r is the roughness factor and $\phi$ the solid fraction. This equation bounds the critical angle as $0° < \theta_c \leq 90°$. In the particular situation when $\theta_{os(w)} = 0°$, oil will spread preferentially over the surface beneath the water droplets, causing water droplets to float on the surface while oil permeates the membrane. In the case of a porous membrane without interconnecting pores, the critical contact angle becomes 90°.

A limiting factor in separation arises from the breakthrough pressure (Jung, Y. C. Langmuir, 14165-14173 (2009) and Tuteja, A. Science, 1618-1622 (2007)). The breakthrough pressure is the minimum pressure at which a water droplet will push through the pore despite otherwise unfavorable wetting characteristics and geometrical constraints. Provided the droplet radius is larger than the pore radius $r_p$, a droplet will permeate the membrane at pressures exceeding the breakthrough pressure $P_B$ which follows from the Young-Laplace equation.

$$P_B = \frac{2\gamma_{wo}\cos\theta_{adv,ws(o)}}{r_p} \quad (7)$$

where $\gamma_{wo}$ is the water-oil interfacial tension and $\theta_{adv,ws(o)}$ is the advancing angle of water on smooth solid in the presence of oil. The pressure drop across the membrane ΔP must be kept below $P_B$. Accordingly, this upper bound on the operating pressure limits the maximum operating flow rate.

To demonstrate the concept of the breakthrough pressure, a hydrophobic/oleophilic membrane was tested under different operating pressures. A polycarbonate track-etch membrane (EMD Millipore) with pores of 600 nm in diameter was coated with octadecyltrichlorosilane (OTS, Sigma-Aldrich). OTS increases the oleophilicity of the membrane while also increasing its hydrophobicity. As shown in FIG. 14d-f, a custom-built acrylic filtration cell was filled with n-hexadecane and dyed water droplets were placed on the surface of the polycarbonate membrane. On a flat OTS-coated substrate, measurements of $\theta_{os(w)}$ and $\theta_{ws(o)}$ indicate that hexadecane with Span 80 completely spreads in the presence of water and water forms nearly spherical droplets in the presence of hexadecane ($\theta_{os(w)} \sim 0°$ and $\theta_{ws(o)} \sim 180°$). These contact angles indicate that there is a thin film of oil under the water droplets as shown in FIG. 14c. The chamber was then slowly pressurized, and the oil began flowing through the membrane while the water droplets remained on the surface. When the pressure drop was raised above the breakthrough pressure of 170 kPa, water droplets began to penetrate the membrane. FIG. 14e demonstrates this effect for one large droplet of diameter 1 mm, and FIG. 14f repeats the process with a distribution of droplet sizes.

Example 5

This Examples demonstrates hierarchical membranes prepared in accordance with some embodiments of the present invention. A caveat of polycarbonate and similar membranes is in their straight-pore geometry. The challenges of such architecture become clear when looking at Darcy's law (Equation (2) above) describing the volumetric flow Q of a fluid of viscosity μ through a membrane of area A, permeability k, thickness L, and pores of radius r subject to a transmembrane pressure ΔP. The thickness of the membrane must be sufficient to render the membrane mechanically robust. While small pores achieve higher breakthrough pressures, the flow rate for such geometries decreases rapidly. The maximum flow rate while still rejecting water droplets is found by setting the transmembrane pressure to the breakthrough pressure and can be expressed in the following relation.

$$Q_{max} = \frac{\rho_p A \gamma_{wo} \pi \cos\theta_{adv,ws(o)}}{4\mu} \frac{r^3}{L} \quad (8)$$

Here $\rho_p$ is the number pore density, $\gamma_{wo}$ is the interfacial tension between water and oil, and is the advancing contact angle of a water droplet on the membrane surface in the presence of oil. This equation explicitly shows how flow rate is increasingly limited for decreasing pore sizes. For track-etch membranes, the number pore density is the same regardless of the size of the pores and limits the achievable flow rates. As the pore size decreases and the breakthrough pressure increases, so does the resistivity. In addition, the track-etch membranes process is not scalable to large area membranes that are needed to filter the large volumes of wastewater generated at recovery and refining sites.

Figure 15:
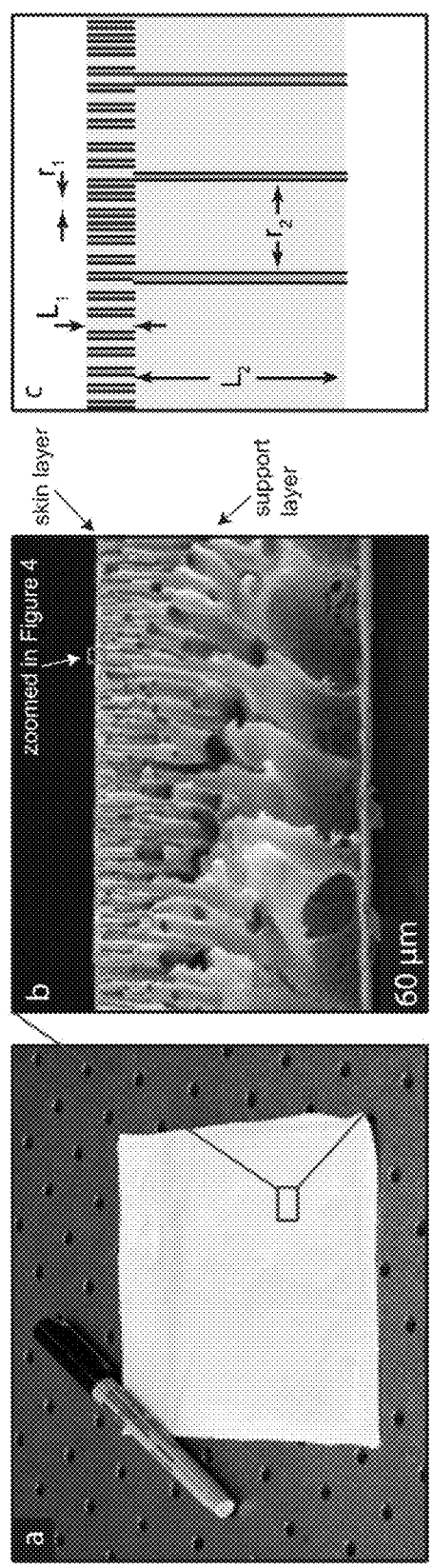
FIG. 15 are photographs and schematics depicting hierarchical membrane in accordance with an illustrative embodiment of the invention.

A different approach was demonstrated by developing hierarchical membranes consisting of a nanoporous separation layer that is integrated with a microporous support layer. This geometry offers the potential to overcome flowrate limitations. FIG. 15c illustrates a hierarchical structure with two layers. The thin nanoporous layer enhances selectivity while the thick microporous layer provides mechanical stability. As the nanoporous layer becomes thinner, a higher flow rate can be achieved for a set membrane thickness and minimum pore size.

$$Q_{max} = \frac{\rho_p A \gamma_{wo} \pi \cos\theta_{adv,ws(o)}}{4\mu r_1} \left( \frac{1}{\frac{L_1}{r_1^4} + \frac{L_2}{r_2^4}} \right) \quad (9)$$

Here $\rho_p$ is the pore density and A is the area of the membrane. The subscripts denote the skin layer (1) and support layer (2) and the variables L and r are the thickness and pore size of the respective layers.

This structure was achieved by employing the non-solvent induced phase inversion technique (discussed in Van de Witte, P., J. Membr. Sci., 1-31 (1996)). Mixtures of polysulfone (PSf) and polyvinylpyrrolidone (PVP) were dissolved in dimethylacetamide (DMAc). Upon curing the PSf in water, the PVP macromolecules migrate to the surface and leave behind a porous matrix. FIG. 15a-b shows a sheet of the cast membrane and an SEM image of the cross-section of the membrane. The structure includes a thin skin layer with nanopores (having pore size between ~30-80 nm) and a thicker layer with micropores (having pore size between ~10-20 μm). The morphology and chemistry of the skin-layer for the PSf membrane is critical to the performance of the membrane since it remains in contact with the feed emulsion during the pressurized separation.

To demonstrate the effectiveness of these membranes, a cast sheet was cut into 25 mm filters and treated with OTS. A feed emulsion comprising 3 wt % water and 97 wt % n-hexadecane was used for the experiments. The oil phase contained 1 wt % Span 80 to stabilize emulsified droplets. Typically, in the absence of a surfactant, the emulsion spontaneously coalesces to a noticeable degree. In some embodiments and examples discussed herein, including Example 5, a surfactant was employed to prevent any coalescence that would otherwise occur over the course of an experiment.

Figure 16:
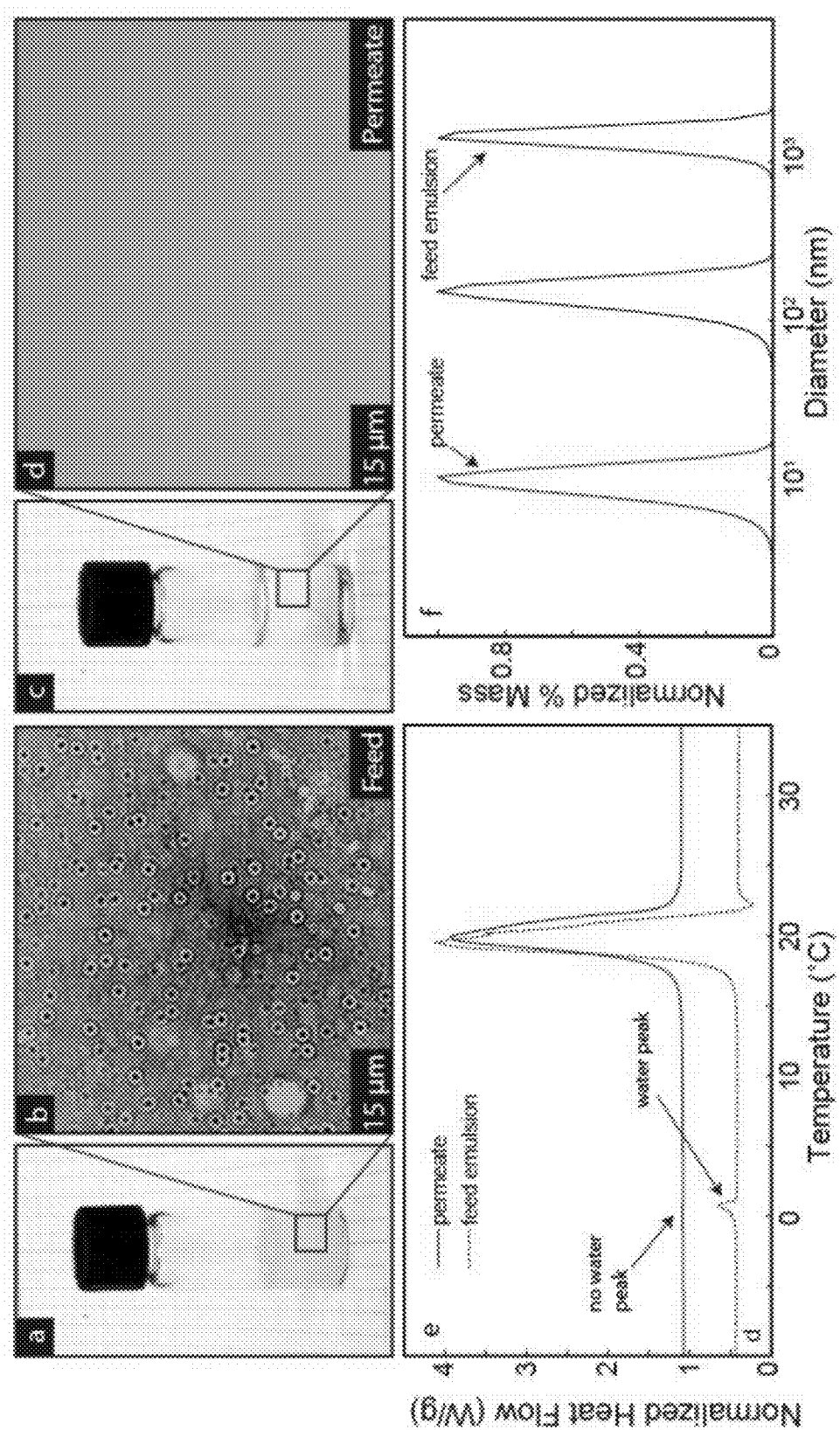
FIG. 16 are photographs and microscopic images to depict the separation of an emulsion by PSf membrane in accordance with an illustrative embodiment of the invention.

The filtration cell was run at a pressure drop of 275 kPa. The feed emulsion was filtered, and the permeate was collected. The cloudy feed emulsion, imaged using optical microscopy, consisted of water droplets with a mean diameter of 1.5 μm as shown in FIG. 16b. In addition to microscopy, dynamic light scattering (DLS) was used to determine the size distribution of smaller droplets. DLS data shows the presence of droplets around 200 nm in the feed as indicated by the middle peak in FIG. 16f.

Passing the feed emulsion through the hierarchical membrane at a pressure drop of 275 kPa yields a visually clear permeate, and optical microscopy shows no evidence of droplets that were otherwise evident in the feed emulsion (FIG. 16d). This finding was supported by the DLS measurement where the 200 nm droplets were non-existent in the permeate data. Instead, only a species with diameter around 10 nm was present. A peak falling in the same size range was also visible in a solution of n-hexadecane containing only 1 wt % Span 80 without any water, suggesting that the species is not water but present due to instrumentation error, a micellar formation of Span 80, or presence of other impurities.

In addition, differential scanning calorimetry (DSC) was used to probe the water content in the permeate samples by monitoring the heat flow into a sample. Samples were frozen to −20° C. and then thawed at a rate of 2.4° C. s$^{-1}$. Since the crystallized water phase melts around 0° C. and hexadecane melts around 18° C., the disparity in melting points of water and oil allow the data to resolve into separate peaks corresponding to the water and hexadecane phases. The feed emulsions show a noticeable peak at 0° C. indicating the presence of water. This peak is not present in the permeate sample indicating that the filtration process has removed water beyond any discernable level.

Example 6

Example 6 demonstrates the ability to precisely tune/control the skin layer thickness. In this example, an additional additive to the phase inversion process was employed to precisely control the resulting thickness of the skin layer. The thickness of the skin layer was varied by a factor of four by using additives during the membrane fabrication. The skin layer was created when the PVP hydrophilic polymers diffused out of the bulk DMAc solution and into the surrounding water. In doing so, the PVP hydrophilic polymers left behind small pores. It was previously hypothesized that increasing the hydrophilicity of such polymers would increase their diffusion rate and thus result in a thinner skin layer.

PVP is hydrophilic due to its carboxyl groups. Polymers such as polyethylene glycol (PEG) are more hydrophilic than PVP owing to their hydroxyl groups, and thus diffuse more quickly out of the bulk solution when immersed. In a typical process, 7 g of PSf and 3 g of PVP/PEG were dissolved in 40 mL of DMAc. The ratio of polysulfone (PSf) to pore former (PVP/PEG) was kept constant, but the ratio of PVP to PEG was varied. PEG is a polymer chain available in varying sizes. In order to encourage more rapid diffusion during the phase inversion, relatively small sized PEG molecules with a weight-averaged molecular weight of 4,000 g/mol was used. For comparison, the weight-averaged molecular weight of the PVP used was 40,000 g/mol.

Figure 17:
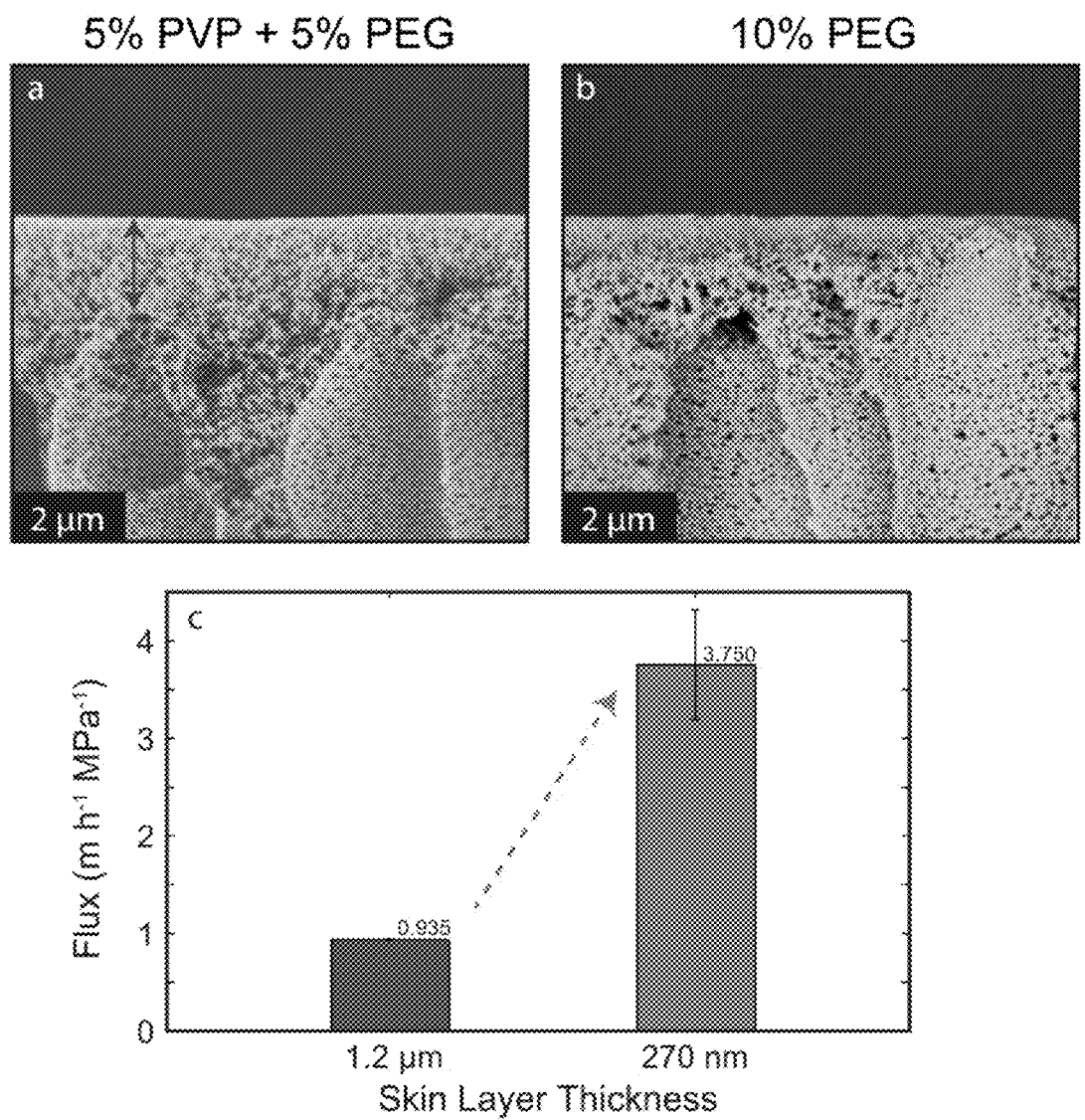
FIG. 17 are SEM images of two fabricated PSf membranes to show the effect of tuning the skin layer thickness to maximize flux in accordance with an illustrative embodiment of the invention.

The resulting membranes had varying skin layer thicknesses ranging from 270 nm to 1.2 µm. Two membranes with skin layer thicknesses of 270 nm and 1.2 µm were chosen for a permeability study. Both membranes had pores in the skin layer ranging from 30 to 80 nm. Their relative dimensions are highlighted in the cross-section views of FIG. 17. The fluxes of pure hexadecane through these two fabricated PSf membranes were measured to demonstrate the capacity. The flux through the membrane with the 270 nm skin layer measured to be 3.75±0.56 m h$^{-1}$ MPa$^{-1}$. The flux through the membrane with the 1.2 µm skin layer measured to be 0.935±0.006 m h$^{-1}$ MPa$^{-1}$. This demonstrated that reducing the skin layer thickness by a factor of four increases the flow rate through the membrane by over a factor of four. By further tuning the fabrication parameters, the skin layer can be made even thinner than the skin layer fabricated in Example 6 to achieve even better flow rates. Additionally, the flux also depends on the viscosity of the permeating liquid. Thus, the use of lower viscosity fluids results in higher fluxes.

Analysis

Many membrane technologies for emulsion separation have been presented in the literature but have not been well characterized based on the size of droplets they separate. The examples above demonstrate a tradeoff that arises in membrane design: permeate selectivity versus permeate flux. Having a membrane with small pores increases selectivity, but at the same time decrease flow rates, whereas having a membrane with large pores decreases selectivity (e.g., allows droplets of larger sizes to come through), but allows for maintenance of typically desirable high flow rates. The methodologies presented here apply to such membranes provided they have sufficiently small pores. In some embodiments presented herein, hierarchical membranes are prepared based on the phase inversion process, which demonstrates the merging of these two regimes. Namely, a thin nanoporous layer maintains high selectivity (e.g., only allows sub-micron droplets to pass through the membrane), while a thick microporous layer yields high flow rates and mechanical stability.

Systems and methods of the present invention allow for separation of emulsified water droplets as small as 1 µm and smaller (e.g., between 1 nm and 1 µm) in size dispersed in oil. While the examples above discuss separating water-in-oil type emulsions, those of ordinary skill in the art would readily appreciate that the same principles of water wettability as discussed above would extend to oil-in-water emulsions. In some embodiments, a hydrophilic/oleophobic membrane may be used to separate oil-in-water emulsions.

Examples discussed above have demonstrated that the thickness of the nanoporous layer can be controlled through the casting process, and that the thickness of this layer determines (or, in some embodiments, has an effect on) the flow resistance. By varying parameters of the casting process, the flux through such membranes was improved by over a factor of four. In some embodiments, skin layers that are even thinner than the skin layers fabricated in the examples above may be successfully fabricated. Since these skin layers are integrated into a microporous support layer, they are more mechanically robust then their through-pore counterparts and can be fabricated to be even thinner.

Some embodiments discussed herein relate to designing efficient emulsion separating processes and their cost-effective implementation. This design methodology extends beyond the separation of oil and water mixtures to realize separation of pharmaceutical and other emulsions, as well as design of deployable separation devices, and control over phases in microfluidic devices.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A hierarchical porous membrane suitable for use in oil/water separation processes, wherein the membrane:
    (i) comprises a polycarbonate;
    (ii) is oleophilic;
    (iii) is hydrophobic;
    (iv) has a first layer with pores having a thickness of between 100 nm and 2 microns and an average pore size from about 25 nm to about 300 nm wherein the first layer comprises a silane coating on the polycarbonate;
    (v) has a second layer with uniform arrays of pores, wherein the second layer is a support layer that is thicker than the first layer, wherein all the pores in the second layer are bigger than all the pores in the first layer; and
    (vi) is configured to separate two or more phases of an oil/water emulsion having droplets below 1 µm in size.

2. The membrane of claim 1, wherein the first layer has a pore size between 30 and 80 nm and the second layer has a pore size between 10 and 20 microns.

3. The membrane of claim 1, wherein the first layer has a thickness from about 0.3 micron to about 2 microns or from about 0.5 microns to about 2.0 microns.

4. The membrane of claim 1, wherein the first layer has an average pore size from about 50 nm to about 200 nm, or from about 100 nm to about 150 nm.

5. The membrane of claim 1, wherein the support layer has a thickness from about 55 microns to about 370 microns.

6. The membrane of claim 1, wherein the support layer has an average pore size from about 10 microns to about 25 microns.

7. The membrane of claim 1, wherein the silane coating comprises at least one member selected from the group consisting of octadecyltrichlorosilane (OTS), methylsilane, phenylsilane, isobutylsilane, dimethylsilane, tetramethyldisilane, hexylsilane, octadecylsilane, and fluorosilane.

8. The membrane of claim 1, wherein the membrane further comprises polyacrylonitrile (PAN).

9. The membrane of claim 1, wherein the membrane has a coating comprising octadecyltrichlorosilane (OTS).

* * * * *